(12) United States Patent
Koike et al.

(10) Patent No.: US 6,500,910 B1
(45) Date of Patent: Dec. 31, 2002

(54) REFRACTIVE INDEX DISTRIBUTION TYPE LIGHT TRANSMITTING DEVICE

(75) Inventors: Yasuhiro Koike, 534-23, Ichigao-cho, Aoba-ku, Yokohama-shi, Kanagawa (JP); Norihide Sugiyama, Kanagawa (JP)

(73) Assignees: Yasuhiro Koike, Yokohama (JP); Asahi Glass Company, Limited, Tokyo (JP)

( * ) Notice: Subject to any disclaimer, the term of this patent is extended or adjusted under 35 U.S.C. 154(b) by 229 days.

(21) Appl. No.: 09/621,359

(22) Filed: Jul. 21, 2000

(30) Foreign Application Priority Data

Jul. 22, 1999 (JP) .......................................... 11-207182

(51) Int. Cl.[7] .............................................. C08F 116/12
(52) U.S. Cl. .................. 526/247; 525/199; 525/200; 524/462; 524/463; 524/520
(58) Field of Search ................................ 525/197, 199, 525/200; 524/462, 463, 520; 526/171, 211, 217, 247, 253

(56) References Cited

U.S. PATENT DOCUMENTS 5,783,636 A    7/1998    Koike et al.
5,916,971 A    6/1999    Koike et al.
6,071,441 A    6/2000    Koganezawa et al.
6,166,125 A  * 12/2000   Sugiyama et al. .......... 524/462

FOREIGN PATENT DOCUMENTS

EP    0 622 878       11/1994
WO    WO 93/13045      7/1993

OTHER PUBLICATIONS

Patent Abstracts of Japan, vol. 017, No. 428 (P–1588), Aug. 9, 1993, JP 05 088026, Apr. 9, 1993.
Patent Abstracts of Japan, vol. 013, No. 291 (P–893), Jul. 6, 1989, JP 01 072103, Mar. 17, 1989.

* cited by examiner

Primary Examiner—Helen L. Pezzuto
(74) Attorney, Agent, or Firm—Oblon, Spivak, McClelland, Maier & Neustadt, P.C.

(57) ABSTRACT

A refractive index distribution type light transmitting device comprising a non-crystalline polymer (a) and a metal chelate compound (b) having a difference in refractive index of at least 0.001 as compared with the non-crystalline polymer (a) and having a molecular weight of at least 400, wherein the metal chelate compound (b) is distributed in the non-crystalline polymer (a) with a concentration gradient in a specific direction.

17 Claims, 1 Drawing Sheet

REFRACTIVE INDEX DISTRIBUTION TYPE LIGHT TRANSMITTING DEVICE

The present invention relates to a refractive index distribution type light transmitting device having both high transparency and heat resistance which used to be difficult to realize with conventional optical resin materials.

Heretofore, as a refractive index distribution type plastic light transmitting device, one having a distribution formed by mixing and polymerizing a monomer capable of presenting a non-crystalline polymer and a non-polymerizable material having a different refractive index, has been known as disclosed in WO93-08488. Further, JP-A-8-5848 discloses that using a non-crystalline fluorine-containing polymer having a fluorine-containing alicyclic structure in its main chain and containing no C-H bond, as a matrix resin, a diffusion material which is melt-diffusible in this resin and which has a refractive index different from this resin, is distributed to obtain a refractive index distribution type plastic light transmitting device.

There is a phenomenon such that when a diffusion material having a different refractive index is melt-dispersed to form a refractive index distribution, the glass transition temperature (Tg) of the optical resin lowers, and the heat resistance decreases. Especially with a plastic light-transmitting device having a diffusion material with a not so high refractive index dispersed therein, it is necessary to increase the content of the diffusion material in order to increase the numerical aperture (NA)[NA=$(n^2-m^2)^{1/2}$, where n is the maximum value of the refractive index of the refractive index distribution type plastic light transmitting device, and m is the minimum value of the refractive index of the refractive index distribution type plastic light transmitting device]. Consequently, there will a problem that Tg lowers substantially, and the heat resistance decreases. On the other hand, if the diffusion material is dispersed to a level close to the limit of the solubility of the diffusion material in the matrix resin in an attempt to increase NA, there will be a problem that micro phase separation tends to occur, and consequently, light scattering tends to increase.

Further, in such a refractive index distribution type plastic light transmitting device, the different refractive index material is merely dispersed in the matrix non-crystalline polymer and is not fixed. Accordingly, there is a problem that when exposed to a high temperature, diffusion or migration takes place, whereby the refractive index distribution changes, and light scattering increases due to coagulation, and consequently the light transmitting performance changes.

On the other hand, as a method of obtaining a light transmitting performance by dispersing a compound having a high refractive index and having good compatibility in a matrix non-crystalline polymer, JP-A-63-106705 proposes a method of forming a refractive index distribution by copolymerizing a monomer comprising a metal salt of a carboxylic acid. But the light transmission loss is at least 800 dB/km (wavelength: 633 nm), and it is impossible to use such a material as a communication medium for a light transmission distance of at least 50 m.

Further, JP-A-5-88026 discloses an optical waveguide having a light amplifying function, or JP-A-7-5505 discloses a light amplifying optical fiber. In each case, the production is a core-clad light transmitting device having a rare earth metal complex dispersed in the matrix polymer of the core portion, but the content of the rare earth metal complex may be at a level of from 1 to 2 wt % for the purpose of light amplification, and the light transmission distance of such a product is at a level of from a few cm to a few m. Further, Appl. Phys. Lett. Vol. 71(17), 2412 (1997) discloses a light amplifying fiber of a refractive index distribution type made of a combination of Eu(TFAA)$_3$(tris-trifluoroacetone europium complex) with a low molecular compound such as triphenylphosphate (TPP), but the content of the rare earth metal complex is at a level of 800 ppm at the maximum, and the light transmission distance is at a level of a few m.

It is an object of the present invention to solve the problems of the conventional refractive index distribution type plastic light transmitting devices and to provide a plastic light transmitting device which is excellent in heat resistance and which has a low light transmission loss and a long light transmission distance.

The present inventors have conducted extensive studies to solve the above problems and as a result, on the basis of an idea that in order to obtain a plastic light transmitting device having improved heat resistance and low light scattering loss, it is important to control Tg of the optical resin material to be low and to reduce the dispersibility of the diffusion material itself, by selecting a compound having a molecular weight larger than a conventional diffusion material known, for example, from WO93-08488, it has been found effective to use, as such a compound, a metal chelate compound comprising an organic ligand and a metal. The present invention has been accomplished on the basis of this discovery. Namely, the present invention provides a refractive index distribution type light transmitting device comprising a non-crystalline polymer (a) and a metal chelate compound (b) having a difference in refractive index of at least 0.001 as compared with the non-crystalline polymer (a) and having a molecular weight of at least 400, wherein the metal chelate compound (b) is distributed in the non-crystalline polymer (a) with a concentration gradient in a specific direction.

Further, the present invention provides such a refractive index distribution type light transmitting device, wherein the metal chelate compound (b) is a metal chelate compound containing a fluorine-containing compound as a ligand.

Further, the present invention provides such a refractive index distribution type light transmitting device, wherein a metal in the metal chelate compound (b) is a rare earth metal.

Further, the present invention provides such a refractive index distribution type light transmitting device, wherein the maximum content of the metal chelate compound (b) in the non-crystalline polymer (a) is from 1 to 20 mass %.

Further, the present invention provides such a refractive index distribution type light transmitting device, wherein the non-crystalline polymer (a) is a non-crystalline fluorine-containing polymer having a cyclic structure in its main chain and having substantially no C—H bond.

Further, the present invention provides such a refractive index distribution type light transmitting device, wherein the light transmitting device is a light transmitting fiber.

Figure 1:
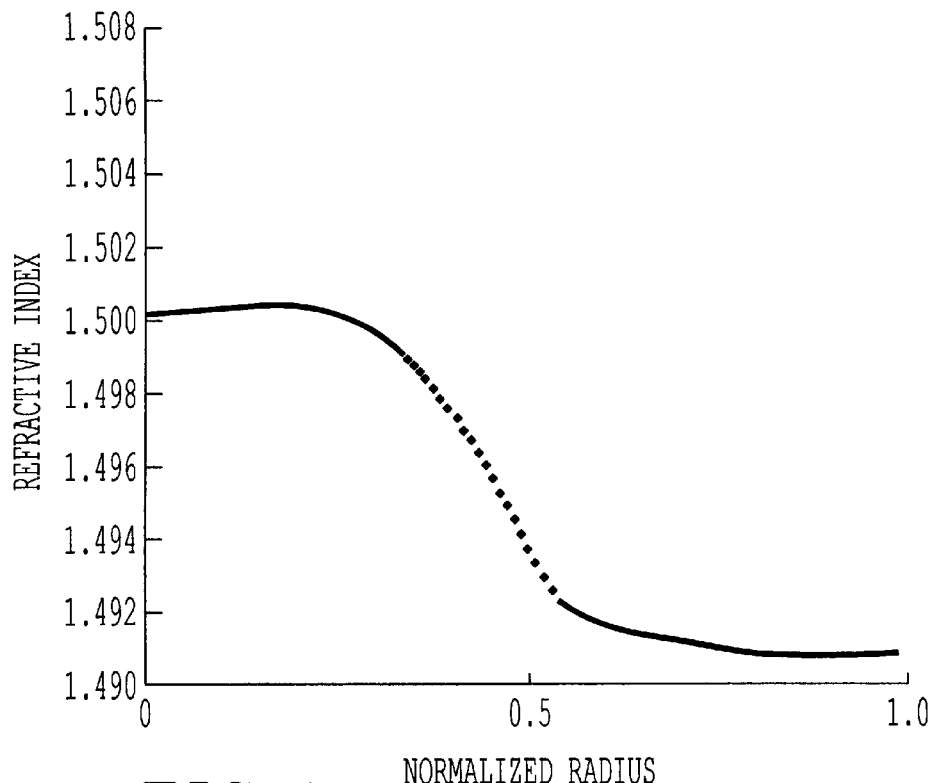
FIG. 1 shows a refractive index distribution in an optical fiber of an Example of the present invention.

Now, the present invention will be described in detail with reference to the preferred embodiments.

In the present invention, the non-crystalline polymer (a) may be a various polymer so long as it is a non-crystalline polymer having transparency. For example, it may be a homopolymer or copolymer of an alkyl methacrylate, an alkyl acrylate, a polyfluoroalkyl methacrylate or a polyfluoroalkyl acrylate, a polycarbonate resin, or a cyclic polyolefin resin. Particularly when a minimum transmission loss with a near infrared light (a wavelength of 850 or 1,300 nm) is required, a fluorine-containing polymer having no C—H bond, as disclosed in JP-A-8-5848, is particularly preferred.

The fluorine-containing polymer containing no C—H bond is preferably a fluorine-containing polymer having a cyclic structure in its main chain. The fluorine-containing polymer having a cyclic structure in its main chain is preferably a fluorine-containing polymer having a fluorine-containing alicyclic structure, a fluorine-containing imide ring structure, a fluorine-containing triazine ring structure or a fluorine-containing aromatic ring structure, particularly preferably a fluorine-containing polymer having a fluorine-containing alicyclic structure. The fluorine-containing polymer having an alicyclic structure in its main chain may, for example, be those having repeating units selected from the following formulae (1) to (3):

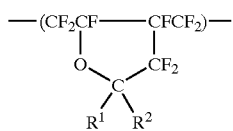

(1)

wherein each of $R^1$ and $R^2$ is F or $CF_3$;

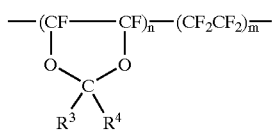

(2)

wherein each of $R^3$ and $R^4$ is F or $CF_3$, n is an integer of at least 1, and m is an integer of at least 0;

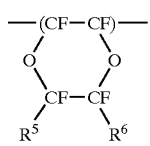

(3)

wherein each of $R^5$ and $R^6$ is F or $CF_3$.

In the present invention, the metal chelate compound (b) comprising a ligand and a metal, has a molecular weight of at least 400, particularly preferably at least 600. The metal chelate compound (b) has an organic compound as a ligand, and it hence has compatibility with the matrix non-crystalline polymer (a).

If the solubility of the metal chelate compound (b) in the non-crystalline polymer (a) is low, micro phase separation or light scattering due to fine crystals of the metal chelate compound (b) tends to occur, which tends to cause an increase of light transmission loss. Accordingly, it is preferred that the solubility is high.

Further, the metal chelate compound (b) is preferably of a structure wherein ligands sterically surround the metal atom, so that the metal will not be in direct contact with the matrix non-crystalline polymer (a). Accordingly, the compound is preferably of a structure in which the metal is surrounded by 2 or 3 ligands. As such, the compound (b) has high compatibility; the increase of the transmission loss due to light scattering can be prevented; and the molecular weight will be large, whereby the diffusion rate in the matrix non-crystalline polymer (a) will be suppressed.

Further, the metal chelate compound (b) preferably has no absorption maximum for a visible light of from 400 to 700 nm. Further, the metal chelate compound (b) has a difference in refractive index of at least 0.001, preferably at least 0.005, particularly preferably at least 0.1, as compared with the non-crystalline polymer (a). Further, the refractive index of the metal chelate compound (b) is preferably higher than the refractive index of the non-crystalline polymer (a).

The numerical aperture (NA) represented by "$(n^2-m^2)^{1/2}$" is preferably at least 0.15, particularly preferably at least 0.20.

The metal chelate compound (b) is preferably non-polymerizable one. Especially when the non-crystalline polymer (a) is polymerized in the presence of the metal chelate compound (b), it is important that the compound (b) is non-polymerizable.

The metal in the metal chelate compound (b) is not particularly limited. As a specific example, it may, for example, be a rare earth element or a transition metal, preferably a rare earth element, particularly preferably a lanthanoid element. The transition metal may, for example, be Zn, Pt or Pd, and the lanthanoid element may, for example, be Ce, Pr, Nd, Eu, Gd or Er. The ligand in the metal chelate compound (b) is not particularly limited, and as a specific example, it may, for example, be a β-diketone such as acetyl acetonate (acac), benzoyl acetonate (pbd), dibenzoyl methane (dbm), 1,1,1-trifluoro-2,4-pentanedion (tfd) or 1,1,1,5,5,5-hexafluoro-2,4-pentanedion (hfd); a polyamine such as 2,2'-bipiperazine (bpip), 2,4-pentanediamine (ptdn), picolylamine (pic), 1,8-naphthyridine (napy) or tris(2-pyridylmethyl)amine (tmpa); or a Schiff base such as salicylidene aminate (salam), N,N'-disalicylidene ethylenediamine (salen) or N-salicyclidene cyclohexyl aminate (salch).

Abbreviations for other ligands in Tables 1 and 2 are as follows.
hepfd:1,1,1,3,5,5,5-heptafluoro-2,4-pentanedion
hfdd:1,1,1,5,5,5-hexafluoro-3,3-deutero-2,4-pentanedion
ttfa:thenoyl trifluoroacetonate
ofhn:1,1,1,5,5,6,6,6-octafluoro-2,4-hexanedion
dfhn:1,1,1,5,5,6,6,7,7,7-decafluoro-2,4-heptanedion
ofpbd:pentafluorobenzoyl trifluoroacetonate
dfdbm:bis(pentafluorobenzoyl)methane
pdoa:pentadecafluorooctanoic acid
dsalch:N,N'-disalicylidene-1,2-cyclohexylenediamine When the above-mentioned fluorine-containing polymer is used as the non-crystalline polymer (a), it is preferred to use as the metal chelate compound (b) a metal chelate compound having a fluorine-containing compound as a ligand. Specifically, metal chelate compounds having fluorine-containing compound Nos. 9 to 37 as identified in the following Tables 1 and 2 as ligands, are preferred from the viewpoint of the solubility in the fluorine-containing polymers or in the fluorine-containing monomers capable of forming such fluorine-containing polymers. Particularly preferred as ligands, are compounds No. 33 to 37 in Tables 1 and 2. The metal compounds having these fluorine-containing compounds as ligands show no substantial light absorption in a near infrared region of at least 700 nm, whereby it becomes possible to use a light source having a wavelength of 850 nm or 1,300 nm. Not only that, the saturated solubility of the metal chelate compounds in the fluorine-containing polymers is sufficiently higher than the concentration of the metal chelate compound required to form the desired refractive index difference (NA), whereby it becomes possible to minimize the increase of the light transmission loss due to light scattering.

In the following Tables 1 and 2, specific combinations of the metal and the ligand in the metal chelate compound (b)

are shown, but the combination is not limited to such examples. Among them, one having a aromatic ring is particularly useful as a compound having a high refractive index. Further, one having fluorine atoms has an improved solubility when the matrix non-crystalline polymer (a) is a fluorine-containing polymer, whereby dispersion of the metal chelate compound (b) in the non-crystalline polymer (a) will be more uniform, thus providing an effect to suppress the increase of light scattering, although the refractive index may decrease. Such metal chelate compounds (b) may be used alone or in combination as a mixture of two or more of them.

TABLE 1

| Chelate compound | Metal | Ligand | |
|---|---|---|---|
| 1 | Eu | acac | $CH_3\text{-CO-CH}_2\text{-CO-}CH_3$ |
| 2 | Tb | | |
| 3 | Eu | pbd | phenyl-CO-CH$_2$-CO-CH$_3$ |
| 4 | Tb | | |
| 5 | Gd | | |
| 6 | Er | | |
| 7 | Nd | | |
| 8 | Eu | dbm | phenyl-CO-CH$_2$-CO-phenyl |
| 9 | Eu | tfd | $CF_3\text{-CO-CH}_2\text{-CO-}CH_3$ |
| 10 | Gd | | |
| 11 | Al | | |
| 12 | Eu | hfd | $CF_3\text{-CO-CH}_2\text{-CO-}CF_3$ |
| 13 | Tb | | |
| 14 | Gd | | |
| 15 | Al | | |
| 16 | Er | | |
| 17 | Nd | | |
| 18 | Gd | | |
| 19 | Eu | hepfd | $CF_3\text{-CO-CHF-}CF_3\text{-CO-}CF_3$ (with H, F) |
| 20 | Tb | | |
| 21 | Gd | | |
| 22 | Al | | |
| 23 | Er | | |
| 24 | Nd | | |

TABLE 2

| Chelate compound | Metal | Ligand | |
|---|---|---|---|
| 25 | Eu | hfdd | $CF_3\text{-CO-CD}_2\text{-CO-}CF_3$ |
| 26 | Tb | | |
| 27 | Gd | | |
| 28 | Al | | |
| 29 | Er | | |
| 30 | Nd | | |
| 31 | Eu | ttfa | $CF_3\text{-CO-CH}_2\text{-CO-thienyl}$ |
| 32 | Gd | | |

TABLE 2-continued

| Chelate compound | Metal | Ligand | |
|---|---|---|---|
| 33 | Eu | ofhn | $CF_3\text{-CO-CH}_2\text{-CO-}CF_2CF_3$ |
| 34 | Eu | dfhn | $CF_3\text{-CO-CH}_2\text{-CO-}CF_2CF_2CF_3$ |
| 35 | Eu | ofpbd | (F-phenyl)-CO-CH$_2$-CO-$CF_3$ |
| 36 | Eu | dfdbm | (F-phenyl)-CO-CH$_2$-CO-(F-phenyl) |
| 37 | Eu | pdoa | $CF_3(CF_2)_6COH$ (C=O) |
| 38 | Eu | salch | salicylaldehyde-cyclohexylimine with OH |
| 39 | Eu | salen | bis(salicylidene)ethylenediamine |
| 40 | Eu | dsalch | bis(salicylidene)cyclohexanediamine |

In the present invention, the refractive index distribution is meant for a region wherein the refractive index changes continuously in a specific direction of the light transmitting device. For example, the refractive index distribution of a refractive index distribution type optical fiber decreases in a radial direction from the center in cross section of the fiber with a curve close to a parabola.

In the present invention, when the metal chelate compound (b) is a substance having a higher refractive index than the non-crystalline polymer (a), the metal chelate compound (b) is distributed with a concentration gradient such that the concentration decreases from the center of the light transmitting device such as an optical fiber in a direction towards the periphery, whereby the refractive index will have a distribution such that the refractive index decreases from the center of the light transmitting device such as an optical fiber in a direction towards the periphery. On the contrary, when the metal chelate compound (b) is a substance having a lower refractive index than the non-crystalline polymer (a), the metal chelate compound (b) will be distributed with a concentration gradient such that the concentration increases from the center of the light transmitting device such as an optical fiber in a direction towards the periphery, whereby the refractive index will have a distribution such that the refractive index decreases from the center of the light transmitting device such as an optical fiber in a direction towards the periphery. Namely, in order to form a refractive index distribution of a light transmitting device, the metal chelate compound (b) may be distributed in the non-crystalline polymer (a) with a concentration gradient from the center of the light transmitting device in a direction towards the periphery.

The content of the metal chelate compound (b) in the present invention may suitably be selected to form the above-mentioned refractive index distribution, but the maximum content is preferably from 1 to 20 wt %, more preferably from 3 to 10 wt %.

In the present invention, to the non-crystalline polymer (a), other additives such as an antioxidant, a molding stabilizer or a releasing agent may be incorporated within a range not to impair the objects of the present invention, in addition to the metal chelate compound (b). The content of such additives may be suitably selected. However, for example, the content of the antioxidant is usually from 0.001 to 1 wt %, preferably from 0.01 to 0.5 wt %. The following two methods may be mentioned as preferred methods for the production of the light transmitting device of the present invention.

(1) At least one type of metal chelate compound (b) is uniformly mixed in a monomer for forming a non-crystalline polymer (a), the mixture is charged into a cylindrical polymerizer, and a preform having a refractive index distribution is produced by so-called interfacial gel polymerization wherein the polymerization is proceeded from the periphery of the polymerizer to form a concentration gradient of (b) from the center towards the periphery. After completion of the polymerization reaction, this preform is subjected to hot stretching to obtain a light transmitting device.

(2) A non-crystalline polymer (a) is melted; at least one type of a metal chelate compound (b) is injected to the center portion of the non-crystalline polymer (a); and molding is carried out while dispersing the metal chelate compound (b) or after the dispersion to form a refractive index gradient from the center towards the periphery. In this case, it is possible that a preform (base material) having a refractive index distribution is formed by rotational molding or extrusion molding, and then this preform is subjected to hot stretching to obtain a light transmitting device. Further, it is also possible to directly obtain a light transmitting device by forming a refractive index distribution by a molding method such as a melt extrusion spinning method.

The refractive index distribution type light transmitting device of the present invention may be a light transmitting device such as an optical fiber by itself, or a base material for a light transmitting device, such as a preform for an optical fiber. When the refractive index distribution type light transmitting device of the present invention is a base material for a light transmitting device, such a base material may be spun by a method such as hot stretching to obtain a light transmitting device such as a refractive index distribution type optical fiber.

The refractive index distribution type light transmitting device of the present invention is useful as various refractive index distribution type light transmitting devices including, for example, a refractive index distribution type optical fiber, a rod lens, an optical waveguide, an optical branching device, a light focusing device, a light branching device, a light attenuator, a light amplifying optical fiber, a light amplifying optical waveguide, an optical switch, an optical isolator, an optical transmitter module, an optical receiver module, a coupler, a polarizer and an optical integrated circuit.

The refractive index distribution type light transmitting device of the present invention is most preferably a refractive index distribution type optical fiber.

For the refractive index distribution type light transmitting device of the present invention, a wide range of light from an ultraviolet light to a near infrared light (from 200 nm to 2,500 nm, preferably from 400 nm to 1,600 nm) can be used as a light source.

With the refractive index distribution type light transmitting device of the present invention, the light transmission distance can be made to be, for example, at least about 50 m, and in some cases, it can be made as long as at least 1 km. Now, the present invention will be described in further detail with reference to Examples. However, it should be understood that the present invention is by no means restricted by such specific Examples.

Reference Examples 1 to 6

Into a glass tube, methyl methacrylate (MMA), 0.5 wt % of benzoyl peroxide (BPO), 0.2 wt % of n-butylmercaptan (nBM) and a metal chelate compound to be used as a refractive index distribution-forming compound as disclosed in Table 3 in an amount as disclosed in Table 3, were charged, uniformly mixed, then sealed and left to stand for 20 hours in an oven of 70° C. for polymerization. The refractive index and Tg of the obtained polymer were measured. As shown in Table 3, it is evident that Tg is high, and heat resistance is excellent when a metal chelate compound of the present invention is employed.

Comparative Reference Examples 1 to 5

Polymerization was carried out in the same manner as in Reference Example 2 using a high refractive index low molecular weight compound which is not a metal chelate compound disclosed in Table 3. The refractive index and Tg of the obtained polymer were measured. The results are shown in Table 3.

TABLE 3

| | Refractive index distribution-forming compound | Content (wt %) | Refractive index | Tg (° C.) |
|---|---|---|---|---|
| Comparative Reference Example 1 | Nil (PMMA only) | 0 | 1.491 | 118 |
| Reference Example 1 | Gd (dbm)$_3$ Mw = 827 | 5 | 1.499 | |
| Reference Example 2 | | 10 | 1.507 | 101 |
| Reference Example 3 | Eu (dbm)$_3$ Mw = 822 | 5 | 1.499 | |
| Reference Example 4 | | 10 | 1.507 | 110 |
| Reference Example 5 | Er (pbd)$_3$ Mw = 651 | 10 | 1.499 | |
| Reference Example 6 | Gd (hfd)$_3$ Mw = 778 | 10 | 1.489 | 117 |
| Comparative Reference Example 2 | TPP  Mw = 326 | 10 | 1.502 | 93 |

TABLE 3-continued

| | Refractive index distribution-forming compound | | Content (wt %) | Refractive index | Tg (° C.) |
|---|---|---|---|---|---|
| Comparative Reference Example 3 | DPS | Mw = 186 | 10 | 1.511 | 80 |
| Comparative Reference Example 4 | DPSO | Mw = 202 | 10 | 1.507 | 88 |
| Comparative Reference Example 5 | BEN | Mw = 212 | 10 | 1.505 | 80 |

In Table 3, symbols indicate the following.
TPP: Triphenyl phosphate
DPS: Diphenyl sulfide
DPSO: Diphenyl sulfoxide
BEN: Benzyl benzoic acid

EXAMPLE 1

Into a glass tube having an inner diameter of 10 mm and a length of 30 cm and held to be horizontal, MMA, 0.5 wt % of BPO and 0.2 wt % of nBM were charged. After sealing both ends, polymerization was carried out for 20 hours while rotating the tube in an oven of 70° C. at 3,000 rpm, to obtain a PMMA hollow tube having a uniform thickness with an outer diameter of 10 mm and an inner diameter of 6 mm.

MMA, 10 wt % of Er(pbd)3 (chelate compound 6), 0.2 wt % of t-butylperoxyisobutyl carbonate (PBI) as a polymerization initiator, and 0.5 wt % of nBM were mixed. This mixed liquid was poured into the above PMMA hollow tube, and this hollow tube was set in an oil bath set at a temperature of 90° C., to carry out the polymerization. 20 Hours later, the monomer mixture liquid poured into the hollow portion was completely solidified. Thereafter, heat treatment was carried out for 40 hours in an oven of 110° C., and reduced pressure heat treatment was carried out for 20 hours in a vacuum oven of 110° C., to obtain a preform rod.

The preform rod was slowly inserted at a constant speed from an upper portion of a cylindrical heating furnace maintained at 195° C., and an optical fiber having a diameter of 0.6 mm and a length of 50 m was spun from a lower portion. The refractive index distribution of this optical fiber was measured by a lateral interference method by means of an interference microscope, whereby the refractive index distribution as shown in FIG. 1, was observed. From the refractive index at the center portion, this optical fiber was found to be a fiber with NA=0.16.

EXAMPLE 2

Figure 2:
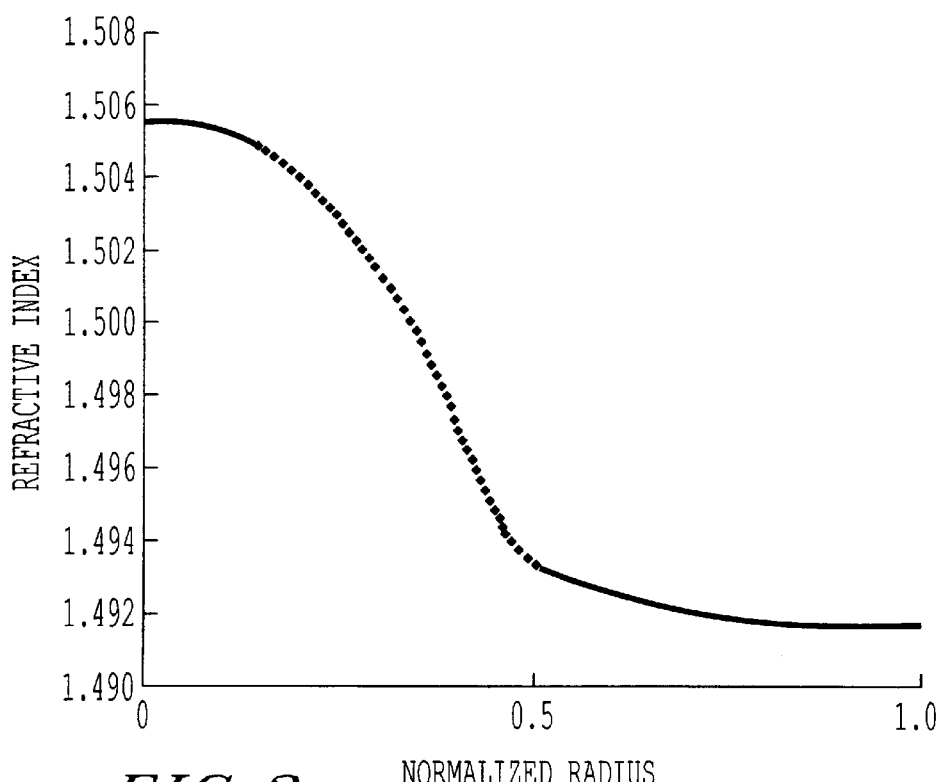
FIG. 2 shows a refractive index distribution in an optical fiber of another Example of the present invention.

Into the hollow tube prepared in Example 1, a mixed liquid comprising MMA, 10 wt % of Eu(dbm)$_3$ (chelate compound 8), 0.2 wt % of PBI as a polymerization initiator and 0.5 wt % of nBM, was poured. This hollow tube was set in an oil bath set at a temperature of 90° C. to carry out the polymerization. 20 Hours later, the monomer mixture liquid poured into the hollow portion was completely solidified. Thereafter, heat treatment was carried out for 40 hours in an oven of 110° C., and further, reduced pressure heat treatment was carried out for 20 hours in a vacuum oven of 110° C., to obtain a preform rod. A part of this preform rod was cut out, and Tg of the center portion was measured by means of a differential scanning calorimeter (DSC) and found to be 110° C. Further, from this preform, an optical fiber having a diameter of 0.6 mm was prepared in the same manner as in Example 1, whereupon the refractive index distribution was measured, whereby the refractive index at the center portion was 1.506 (corresponding to NA=0.21), as shown in FIG. 2. By means of a light source of white light and a spectrum analyzer, the transmission loss of this optical fiber was measured and found to be 200 dB/km with a wavelength of 650 nm.

This optical fiber was maintained at 85° C. for 1,000 hours and then, the refractive index distribution was measured again, whereby the initial distribution pattern was maintained. Further, this optical fiber was confirmed that it was free from a change in the refractive index distribution pattern even after being maintained at 90° C. for 1,000 hours.

Comparative Example 1

In Example 2, an optical fiber of a refractive index distribution type was prepared (NA=0.20, center portion Tg=80° C.) using 10 wt % benzyl benzoate (BEN) as a non-chelate compound instead of the chelate compound 8, and the refractive index distribution pattern before and after being maintained at 85° C. for 1,000 hours was measured, whereby the distribution pattern was found to have changed.

Thus, it is evident that the refractive index distribution type optical fiber employing the chelate compound of the present invention has high heat resistance as compared with the one employing a conventional non-chelate compound.

Reference Example 7

A polymer (a polymer of the formula (1) wherein each of $R^1$ and $R^2$ is F) obtained by cycle polymerization of a fluoro(butenylvinylether) [PBVE], was dissolved in perfluoro(2-butyltetrahydrofuran) [PBTHF] to obtain a 10 wt % solution. To this solution, Eu(dfhn)$_3$ (chelate compound 34) was mixed to prepare mixed solutions having concentrations of 1, 3 and 5 wt %, respectively, to the polymer. These mixed solutions were cast on a glass plate. While supplying nitrogen in an oven, the temperature was gradually raised to evaporate PTBTHF to obtain a sample of film form. This film was further dried for 1 day in a vacuum oven at 100° C. to obtain a film of a fluorine-containing polymer composition having the chelate compound 34 uniformly dispersed.

The refractive index of this film was measured, and the results are shown in Table 4. It was confirmed that the refractive index was higher than the PBVE polymer alone (Comparative Reference Example 6). Further, it was also confirmed that decrease in the glass transition temperature was little.

Reference Example 8

Using Nd(dfhn)$_3$ instead of Eu(dfhn)$_3$ in Reference Example 7, a film was prepared in the same manner, and the refractive index was measured, and the results are shown in Table 4. It was confirmed that the refractive index was higher than the PBVE polymer alone, and decrease in the glass transition temperature was little.

Comparative Reference Examples 6 and 7

The refractive index of a film made solely of a polymer obtained by cyclic polymerization of PBVE is shown in Table 4 (Comparative Reference Example 6).

Further, a film was prepared by using chlorotrifluoroethylene oligomer (number average molecular weight: 800) disclosed in JP-A-8-5848 instead of the chelate compound, and the refractive index was measured, and the results are shown in Table 4 (Comparative Reference Example 7). It is evident that in order to increase the refractive index by an addition of chlorotrifluoroethylene oligomer, it is necessary to increase the content as compared with a case where the chelate compound is employed. Further, it is evident that Tg thereby decreased substantially.

TABLE 4

| | Refractive index distribution-forming compound | Content (wt %) | Refractive index | Tg (° C.) |
|---|---|---|---|---|
| Comparative Reference Example 6 | Nil | 0 | 1.340 | 108 |
| Reference Example 7 | Eu (dfhn)$_3$ M = 1073 | 1 | 1.351 | 108 |
| | | 3 | 1.353 | 107 |
| | | 5 | 1.355 | 105 |
| Reference Example 8 | Nd (dfhn)$_3$ M-1065 | 1 | 1.351 | 108 |
| | | 3 | 1.352 | 108 |
| | | 5 | 1.353 | 106 |
| Comparative Reference Example 7 | Chlorotrifluoro-ethylene oligomer M = 800 | 15 | 1.357 | 75 |

EXAMPLE 3

Into a glass tube having an inner diameter of 25 mm, PBVE polymer pellets were charged, melted under rotation at 240° C. and then cooled to obtain a hollow tube having an inner diameter of 15 mm and a length of 20 cm. While heating at 50° C. and rotating at 200 rpm, a PBVE polymer/Eu(dfhn)$_3$/PBTHF mixture (the proportion of Eu(dfhn)$_3$ to the PBVE polymer was 5 wt %) of Reference Example 7 was dropwise added into the interior of this hollow tube, and a predetermined amount was poured while evaporating PBTHF. When high viscosity was reached, the rotational speed was set at 2,000 rpm, and PBTHF was removed by evaporation to obtain a hollow preform having an inner diameter of 10 mm. This preform was dried for 3 days at 100° C. and then an optical fiber having an outer diameter of 0.4 mm was spun in the same manner as in Example 1. However, during spinning, the hollow portion was maintained to be under reduced pressure so that the fiber would not be hollow.

The transmission loss of this optical fiber was measured and found to be 170 dB/km with a wavelength of 850 nm and 100 dB/km with 1,300 nm, and thus it was confirmed that near infrared light can also be transmitted satisfactorily.

EXAMPLE 4

Using Nd(dfhn)$_3$ instead of Eu(dfhn)$_3$ in Example 3, an optical fiber was prepared.

The transmission loss of this optical fiber was measured and found to be 200 dB/km with a wavelength of 850 nm and 150 dB/km with 1,300 nm, and thus, it was confirmed that near infrared light can also be transmitted satisfactorily.

As described in the foregoing, the light transmitting device of the present invention is excellent in heat resistance, has a low light transmission loss and is capable of increasing the light transmission distance.

What is claimed is:

1. A device, comprising a non-crystalline polymer (a) and a metal chelate compound (b) and having a molecular weight of at least 400, wherein the metal chelate compound (b) is distributed in the non-crystalline polymer (a) with a concentration gradient in a specific direction, and the non-crystalline polymer (a) is a fluorine-containing polymer comprising a cyclic structure in its main chain and having substantially no C—H bond.

2. The refractive index distribution type light transmitting device according to claim 1, wherein the metal chelate compound (b) is a metal chelate compound containing a fluorine-containing compound as a ligand.

3. The refractive index distribution type light transmitting device according to claim 1, wherein a metal in the metal chelate compound (b) is a rare earth metal.

4. The refractive index distribution type light transmitting device according to claim 1, wherein the metal chelate compound (b) is a metal chelate compound containing a fluorine-containing compound as a ligand, wherein a metal is a rare earth metal.

5. The refractive index distribution type light transmitting device according to claim 1, wherein the maximum content of the metal chelate compound (b) in the non-crystalline polymer (a) is from 1 to 20 wt %.

6. The device according to claim 1, wherein the fluorine-containing polymer comprises at least one structure selected from the group consisting of a fluorine-containing alicyclic structure, a fluorine-containing imide ring structure, a fluorine-containing triazine ring structure, and a fluorine-containing aromatic ring structure.

7. The device according to claim 1, wherein the fluorine-containing polymer comprises at least one fluorine-containing alicyclic structure.

8. The device according to claim 1, wherein the fluorine-containing polymer comprises a fluorine-containing alicyclic structure having at least one repeating unit selected from the group consisting of

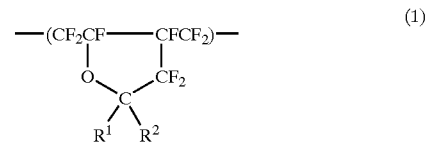

(1)

wherein each of $R^1$ and $R^2$ is F or $CF_3$;

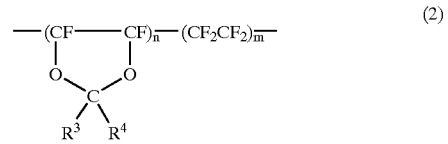

(2)

wherein each of $R^3$ and $R^4$ is F or $CF_3$, n is an integer of at least 1, and m is an integer of at least 0; and

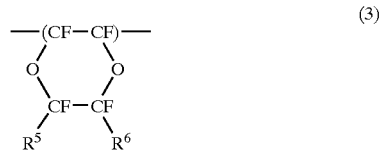

(3)

wherein each of $R^5$ and $R^6$ is F or $CF_3$.

9. A fiber, comprising a non-crystalline polymer (a) and a metal chelate compound (b) and having a molecular weight of at least 400, wherein the metal chelate compound (b) is distributed in the non-crystalline polymer (a) with a concentration gradient in a specific direction, and the non-crystalline polymer (a) is a fluorine-containing polymer comprising a cyclic structure in its main chain and having substantially no C—H bond.

10. The refractive index distribution type light transmitting fiber according to claim 9, wherein the metal chelate compound (b) is a compound having a higher refractive index than the non-crystalline polymer (a), and the metal chelate compound (b) has a concentration gradient such that the concentration decreases from the center in cross section of the fiber in a direction towards the periphery.

11. The refractive index distribution type light transmitting fiber according to claim 9, wherein the maximum content of the metal chelate compound (b) in the non-crystalline polymer (a) is from 1 to 20 wt %.

12. The refractive index distribution type light transmitting fiber according to claim 9, wherein the metal chelate compound (b) is a metal chelate compound containing a fluorine-containing compound as a ligand.

13. The refractive index distribution type light transmitting fiber according to claim 9, wherein a metal in the metal chelate compound (b) is a rare earth metal.

14. The refractive index distribution type light transmitting fiber according to claim 9, wherein the metal chelate compound (b) is a metal chelate compound containing a fluorine-containing compound as a ligand, wherein a metal is a rare earth metal.

15. The fiber according to claim 9, wherein the fluorine-containing polymer comprises at least one structure selected from the group consisting of a fluorine-containing alicyclic structure, a fluorine-containing imide ring structure, a fluorine-containing triazine ring structure, and a fluorine-containing aromatic ring structure.

16. The fiber according to claim 9, wherein the fluorine-containing polymer comprises at least one fluorine-containing alicyclic structure.

17. The fiber according to claim 9, wherein the fluorine-containing polymer comprises a fluorine-containing alicyclic structure having at least one repeating unit selected from the group consisting of

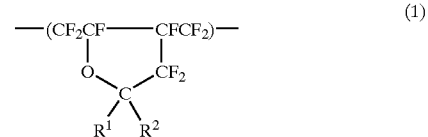

wherein each of $R^1$ and $R^2$ is F or $CF_3$;

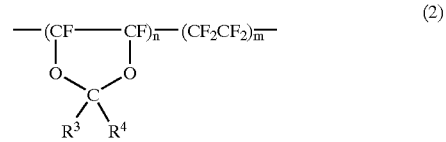

wherein each of $R^3$ and $R^4$ is F or $CF_3$, n is an integer of at least 1, and m is an integer of at least 0; and

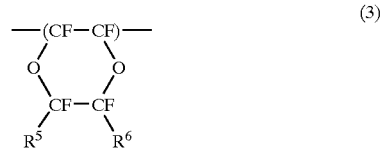

wherein each of $R^5$ and $R^6$ is F or $CF_3$.

* * * * *